United States Patent
Merle

[11] 3,968,918
[45] July 13, 1976

[54] METHOD AND APPARATUS FOR PRODUCING CONTINUOUS LENGTHS OF COAXIAL PRODUCTS

[75] Inventor: Michel Merle, Elmira, N.Y.
[73] Assignee: Andrew Corporation, Orland Park, Ill.
[22] Filed: Nov. 11, 1974
[21] Appl. No.: 522,321

Related U.S. Application Data

[63] Continuation-in-part of Ser. No. 414,696, Nov. 11, 1974, abandoned.

[52] U.S. Cl. ............................ 228/148; 228/17.5; 228/110; 228/1
[51] Int. Cl.² ................ B23K 31/02; B23K 1/06
[58] Field of Search ........... 29/474.1, 473.9; 228/5, 228/146–148, 130, 129, 17.5, 5.1; 156/51, 54–56, 79, 201, 203, 212, 213, 218, 244, 461, 463, 468, 475, 500; 174/102 R, 105 R, 110 F, 113 R, 113 C, 120 C

[56] References Cited
UNITED STATES PATENTS

| | | | |
|---|---|---|---|
| 3,229,012 | 1/1966 | Garner | 264/174 |
| 3,360,850 | 1/1968 | Avila | 29/470.1 |

*Primary Examiner*—Al Lawrence Smith
*Assistant Examiner*—Margaret Joyce
*Attorney, Agent, or Firm*—Leydig, Voit, Osann, Mayer & Holt, Ltd.

[57] ABSTRACT

A method and apparatus for producing continuous lengths of coaxial products, such as coaxial cable, having concentric inner and outer conductors or other members, and an intermediate layer of dielectric or insulating material between the inner and outer members. A continuous length of the inner member is continuously advanced while a concentric layer of insulating material is continuously formed on the outer surface of the inner member, with the radial thickness of the insulating layer increasing in the machine direction in a predetermined zone traversed by the continuously advancing inner member. A continuous flat metal strip is continuously advanced alongside the inner member and is formed into an outer member surrounding the inner member, after which the longitudinal edge portions of the rolled strip are joined before the insulating material reaches its maximum radial thickness. Consequently, the outer member is completed to enclose the inner member and insulating material when the insulating material reaches its maximum radial thickness. The longitudinal edge portions of the metal strip are preferably joined by overlapping them and forming a lap seam by ultrasonic welding. The metal strip is preferably formed into the desired outer conductor by rolling it around the outer surface of an extrusion nozzle through which the inner member is passed while extruding expandable plastic material onto the inner member, with an anvil mounted on the end of the extrusion nozzle to form an ultrasonic welding station for joining the edge portions of the metal strip before the plastic material on the inner conductor expans to its maximum thickness.

13 Claims, 12 Drawing Figures

METHOD AND APPARATUS FOR PRODUCING CONTINUOUS LENGTHS OF COAXIAL PRODUCTS

This application is a continuation-in-part of Ser. No. 414,696, filed Nov. 11, 1974, now abandoned.

DESCRIPTION OF THE INVENTION

The present invention relates generally to the production of coaxial cables and the like and, more particularly, to an improved method and apparatus for producing continuous lengths of coaxial cable or similar products having a layer of dielectric or other insulating material surrounding an inner conductor or core member and a metal sheath surrounding the dielectric or insulating layer.

Heretofore, continuous lengths of coaxial cable and similar products have been commercially fabricated on continuous production lines by extruding an expandable thermoplastic material onto continuous lengths of a preformed conductor or core member, expanding and setting the thermoplastic material, and then forming a metal sheath around the thermoplastic material. The metal sheath has generally been formed from a continuous length of flat metal strip that is rolled into a closed metal tube concentric with the thermoplastic material and the inner conductor or core member, after which the longitudinal edges of the rolled strip are joined together by resistance welding or the like. In order to avoid any damage to the thermoplastic material from the welding operation, the metal sheath is initially formed with an inside diameter greater than the outside diameter of the thermoplastic material so as to provide a space between the rolled metal tube and the thermoplastic material at the welding station. Then after the welding operation is completed, the outer sheath is drawn to reduce its inside diameter closer to the diameter of the thermoplastic layer.

The process described above is satisfactory, as evidenced by the fact that it has been in commercial use for a number of years, and it produces a high quality product. However, there is a continuing need for new and improved methods and apparatus that reduce capital and/or material costs, and/or increase production speed, while still producing a high quality product.

Other methods and apparatus that are known to the present inventor and his assignee for the production of coaxial cables or tubing are those described in the following U.S. Pat. Nos.

| | |
|---|---|
| 2,885,737 | 3,461,499 |
| 3,085,729 | 3,529,340 |
| 3,341,385 | 3,553,811 |
| 3,360,850 | 3,576,939 |
| 3,373,244 | 3,615,977 |
| | 3,629,941 |
| | 3,657,809 |

It is, therefore, a principal object of the present invention to provide an improved method and apparatus for producing coaxial cables and tubing with lower capital and material costs than the methods and apparatus known heretofore, and at a greater production speed. A related object is to provide such an improved method and apparatus that produce a high quality product.

Another object of the invention is to provide such an improved method and apparatus that permit all the operations that have previously been carried out on two separate production lines to be completed on a single, relatively short production line.

A more particular object of this invention is to provide such an improved method and apparatus that permit the use of thinner gauge metal for the outer sheath, thereby reducing material costs without any sacrifice in product performance (thin outer conductors do not degrade the performance of coaxial cables because in the transmission of high frequency electrical signals the current concentrates in the conductor surface, a phenomenon known as "skin effect"). In this connection, a related object is to provide such a method and apparatus that permit the use of more efficient welding techniques that generate less heat than welding techniques used heretofore so that the resulting product can be cooled more rapidly, thereby permitting the use of shorter and less expensive production lines.

It is also an object of this invention to provide a method and apparatus of the foregoing type that do not require any drawing of the outer conductor or metal sheath.

Another specific object of this invention is to provide such an improved method and apparatus which permit the entire coaxial product to be formed at essentially a single work station, so that only a relatively short production line is needed to produce a finished product.

Still another object of the present invention is to provide such an improved method and apparatus that permit the use of ultrasonic welding so as to obtain the benefit of the advantages flowing therefrom.

A further object of the invention is to provide such an improved method and apparatus that facilitate corrugation of the resulting coaxial product (to improve the flexibility and/or strength of the product).

A still further object of the invention is to provide such an improved method and apparatus that provide a high degree of reliability in continuous production lines, and which produce a highly uniform product over extended operating periods.

Other objects and advantages of the invention will be apparent from the following detailed description taken with the accompanying drawings, in which:

FIG. 1 is a perspective view of a method and apparatus embodying this invention for producing coaxial cable or the like;

While the invention is susceptible of various modifications and alternative constructions, certain illustrative embodiments have been shown in the drawings and will be described below in considerable detail. It should be understood, however, that there is no intention to limit the invention to the specific forms disclosed but, on the contrary, the intention is to cover all modifications, alternative constructions, and equivalents falling within the spirit and scope of the invention.

Figure 1:
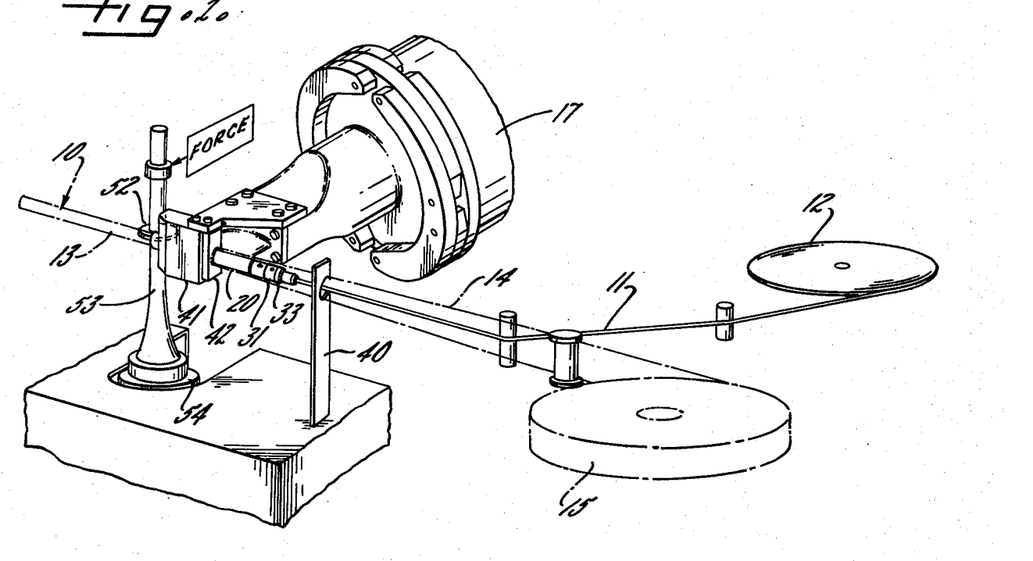
Figure 2:
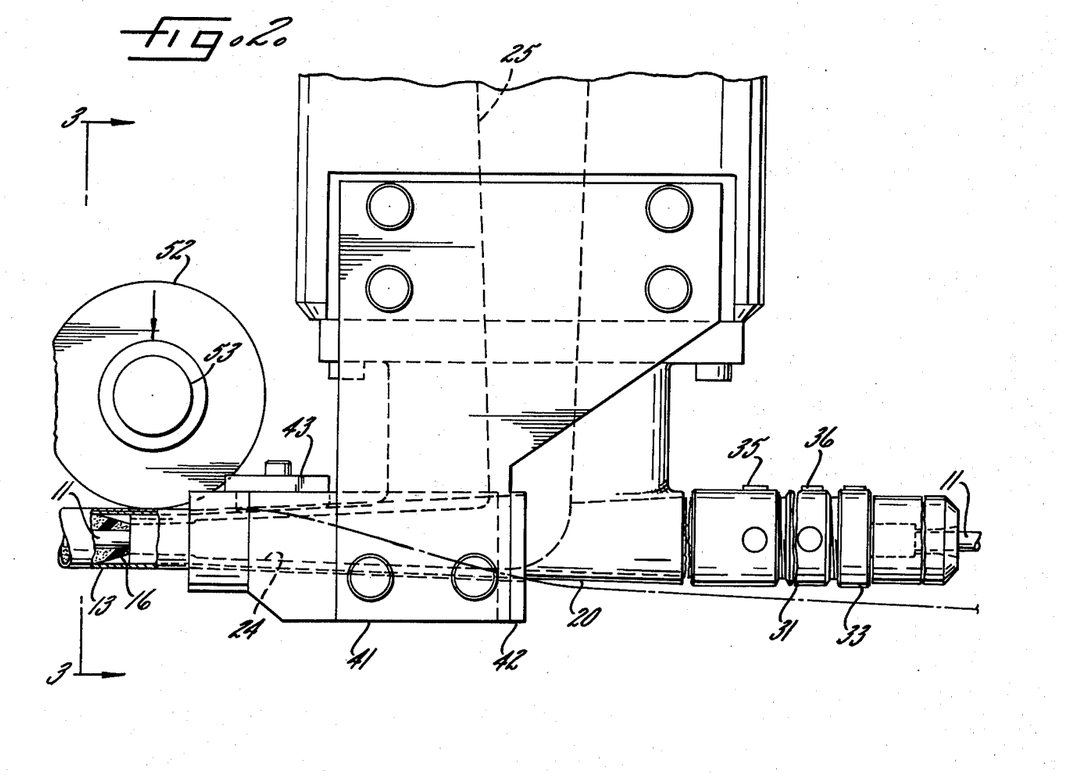
FIG. 2 is an enlarged top plan view of the work station where the various materials comprising the coaxial product are brought together in the method and apparatus of FIG. 1.
Figure 3:
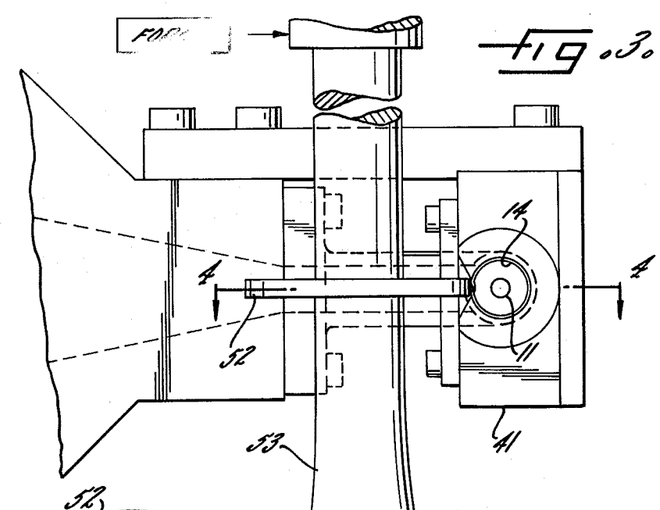
FIG. 3 is a view taken along line 3—3 in FIG. 2.

Turning now to the drawings and referring first to FIG. 1, there is shown a method and apparatus for producing continuous lengths of coaxial cable 10 from an inner conductor 11 supplied from a coil 12, an outer conductor 13 formed from a metal strip 14 supplied from a coil 15, and an expandable dielectric material 16 (FIG. 2) supplied under pressure and in molten form from an extruder 17. The inner conductor 11 is typically a solid conductor made of copper or copper-clad aluminum, although other types of conductors such as multi-strand conductors and hollow conductors may be used if desired. The metal strip 14 used to form the outer conductor is typically copper or copper-clad aluminum, although other materials such as aluminum may be used. While the illustrative method and apparatus will be hereinafter described with specific reference to the manufacture of coaxial cable, it will be appreciated that this manufacturing system is equally applicable to the production of other coaxial products such as coaxial tubing in which the intermediate layer of extruded plastic material 16 serves as a thermal insulator rather than a dielectric.

To form a concentric layer of the expandable dielectric material 16 on the outer surface of the inner conductor 11, the conductor 11 is passed through an elongated extrusion nozzle 20 (see FIG. 4) while the dielectric material 16 is being extruded through the nozzle 20 in molten form. The conductor 11 enters the nozzle 20 through an entry member 21 secured by a set screw 22 to the end of a barrel 23 that extends into and through a major portion of the longitudinal passageway 24 formed by the nozzle 20. The purpose of this barrel 23 is to guide the conductor 11 concentrically through the nozzle passageway 24, and the barrel 23 terminates short of the front end of the nozzle 20 so that the molten dielectric material 16 is brought into contact with the conductor 11 before the two materials leave the front end of the nozzle 20. Just beyond the front end of the barrel 23, the nozzle passageway 24 converges toward the conductor 11 to form a precisely dimensioned annular space around the conductor 11 which is necessary so that exactly the desired amount of dielectric material 16 is metered onto the conductor 11 as it exits from the extrusion nozzle.

Figure 4:
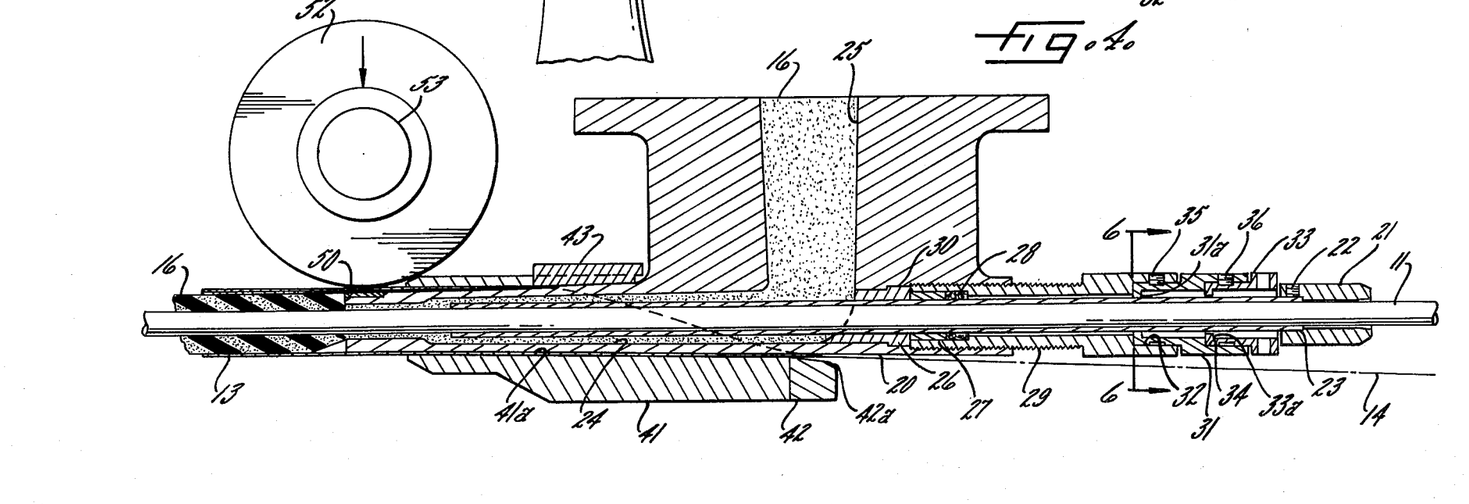
FIG. 4 is an enlarged section taken along line 4—4 in FIG. 3.

As can be seen most clearly in FIG. 4, the molten dielectric material 16 enters the longitudinal passageway of the extrusion nozzle 20 through a lateral passageway 25 connected to the extruder 17. This dielectric material is expandable, i.e., foamable, but it is maintained under pressure in the extruder 17 and nozzle 20 to prevent expansion (foaming) thereof until it is discharged from the nozzle 20. Upon discharge from the extrusion nozzle, the pressure on the dielectric is immediately reduced and, therefore, it immediately begins to expand, as illustrated at the left-hand side of FIG. 4.

At the rear end of the longitudinal nozzle passageway 24, the barrel 23 extends through a pair of sleeves 26 and 27 and annular packing 28 which provide a seal along the outer surface of the barrel 23 to prevent the leakage of any of the molten plastic material through the rear end of the nozzle 20. The two sleeves 26 and 27 and the packing 28 are held in place by a third sleeve 29 which is threaded into the rear end of the nozzle 20, urging the packing 28 and sleeve 27 against the sleeve 26, and urging the sleeve 26 against a shoulder 30 formed by the nozzle 20.

For the purpose of adjusting the orientation of the conductor-guiding barrel 23 relative to the nozzle passageway 24, a pair of eccentric adjusting devices are disposed around the rear portion of the barrel 23 adjacent the forward end of the entry member 21. The first adjusting device comprises a stepped sleeve 31 having an eccentric outer surface 31a fitted into a bore 32 in the sleeve 29, which is concentric with the nozzle passageway 24. The second adjusting device comprises a second stepped sleeve 33 fitted into a concentric bore 34 in the sleeve 31 and forming an inturned flange 33a with an eccentric inner surface 33b engaging the barrel 23. The outer surface of the sleeve 33 is concentric with the inner surface of sleeve 31. The two sleeves 31 and 33 are held within the respective bores 32 and 34 by means of set screws 35 and 36 extending into mating grooves formed in the outer surfaces of the sleeves 31 and 33 and extending around the entire circumference thereof so that the adjusting sleeves 31 and 33 can be rotated to effect eccentric adjustment of the inturned flange 33. Since this flange 33a engages the barrel 23, the radial position of the barrel 23 is adjusted in response to turning of the sleeves 31 and 33 in their respective bores. This adjustment in the radial position of the barrel 23 affects only the rear portion thereof because the forward portion of the barrel is held in concentric relationship to the nozzle passageway 24 by means of a plurality of ears 23a formed on the barrel 23 and engaging the walls of the passageway 24. Thus, when the adjusting sleeves 31 and 33 are rotated, the rear portion of the barrel 23 pivots about the fulcrum formed by the ears 23a.

Figure 6:
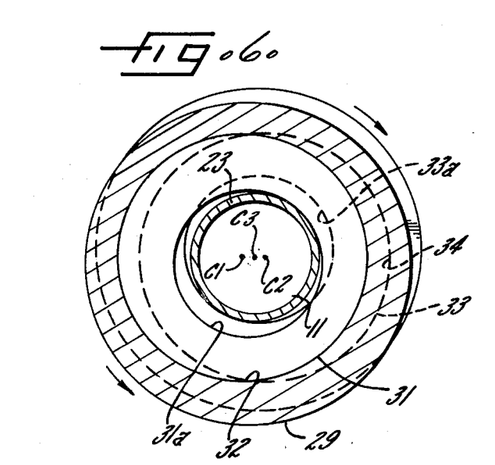
FIG. 6 is an enlarged section taken along line 6—6 in FIG. 4.

The operation of the two adjusting sleeves 31 and 33 and their respective eccentric surfaces to vary the radial position of the barrel 23, and thus the conductor 11, is shown most clearly in FIG. 6. It can be seen that the centers C1 and C2 of the two eccentric surfaces 31a and 33b are offset from each other. Consequently, by rotating both the adjusting sleeves to different angular positions, the radial position of the barrel 23 can be adjusted over a relatively wide range to maintain concentricity of the conductor 11 and the walls of the nozzle passageway 24 at the exit end of the nozzle.

In accordance with one important aspect of the invention, the continuous flat metal strip 14 is continuously advanced alongside the inner conductor 11 and formed into the tubular outer conductor 13, with the longitudinal edges of the strip 14 being joined before the dielectric material 16 reaches its maximum radial thickness so that the outer conductor 13 completely encloses the dielectric material 16 when the latter reaches its final dimension. Thus, in the illustrative embodiment the flat metal strip 14 is advanced in parallel with the inner conductor 11 and passed through a preforming tool 40 which curls the strip 14 into an open annulus so that the strip forms a generally C-shaped cross-section as it passes alongside the adjusting sleeves 31 and 33. As the curled strip 14 advances alongside the extrusion nozzle 20, it enters a forming die 41 through an entry plate 42 to complete the forming of the strip 14 into a continuous tubular configuration.

More particularly, the entry plate 42 forms a tapered bore 42a which continues the curling of the strip 14 and guides it into a longer and more gradually tapered bore 41a in the die 41. As the strip 14 advances through the die 41, it is converted from an open annulus to a closed annulus by the action of the walls of the bore 41a rolling the curled strip into a closed tube. As can be seen most clearly in FIGS. 4 and 7, the bores of the entry plate 42 and the die 41 are formed concentrically around the extrusion nozzle 20 so as to form a tapered annular passageway along the outer surface of the nozzle 20. Thus, the outer surface of the nozzle 20 is also used as a forming surface acting on the inside surface of the tube formed by the rolling of the strip 14, preventing the edges of the strip 14 from turning in as it is rolled into a tube, and ensuring the formation of a smooth closed tube.

Figure 5:
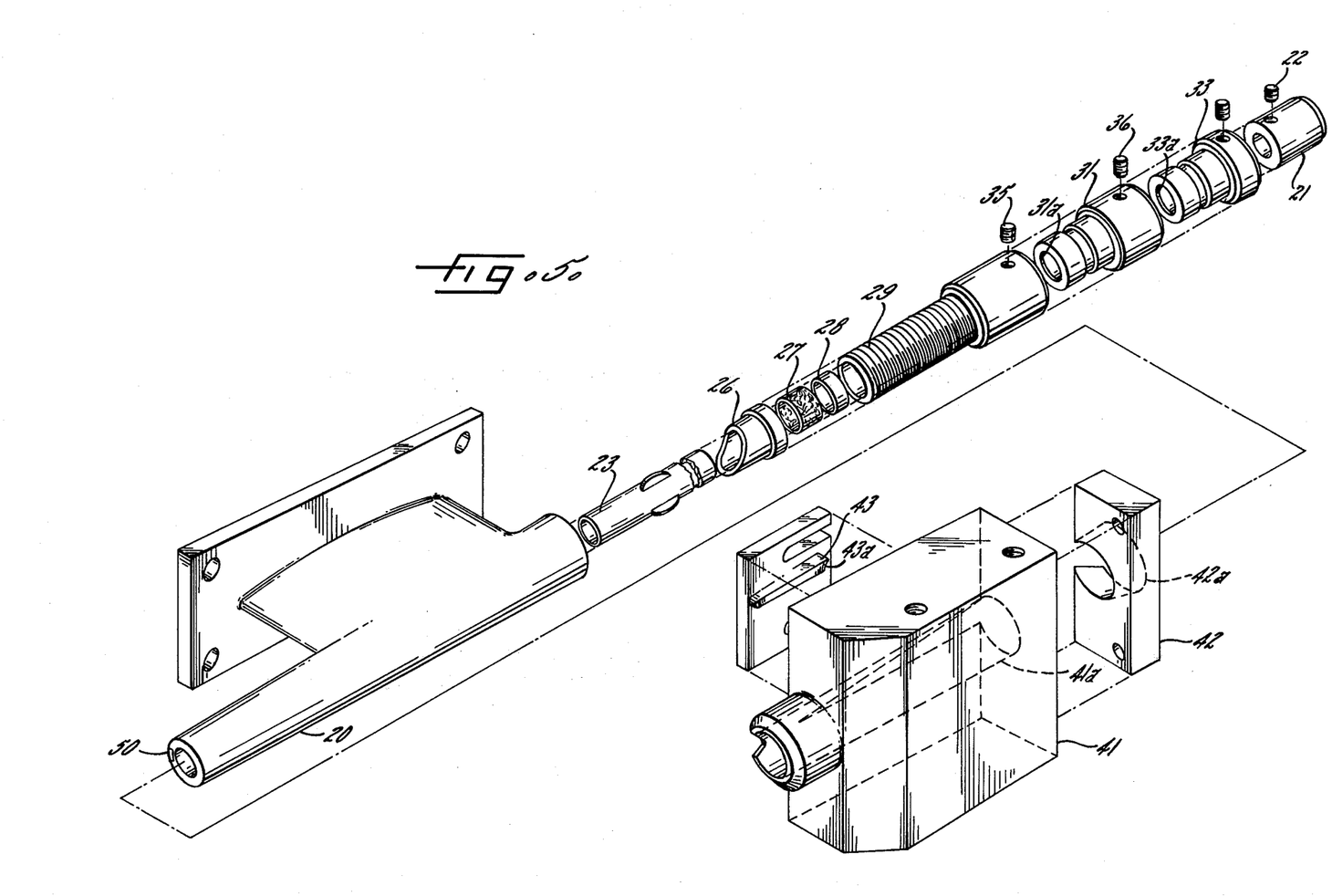
FIG. 5 is an exploded perspective view of the apparatus shown in FIGS. 2–4, excluding the supporting frame and mounting elements.
Figures 7, 8, 9:
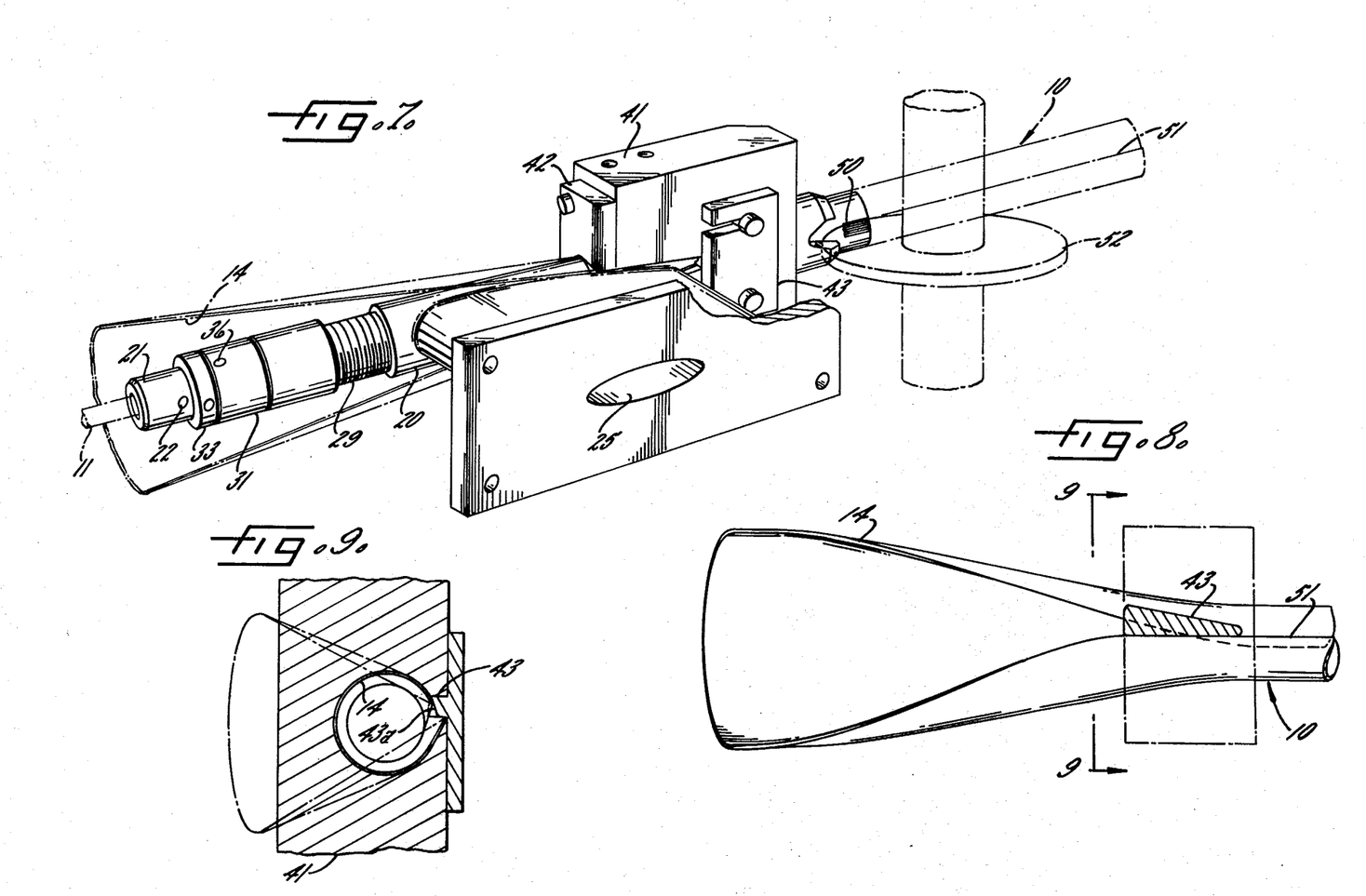
FIG. 7 is an enlarged perspective view of the same parts shown in FIG. 5 in their assembled positions, and taken from the rear side of the apparatus as shown in FIG. 5.
FIG. 8 is an enlarged vertical section taken through the tucking tool in the apparatus of FIGS. 1–7, showing this tool acting on the metal strip that forms the outer conductor.
FIG. 9 is a section taken along line 9—9 in FIG. 8.
Figure 10:
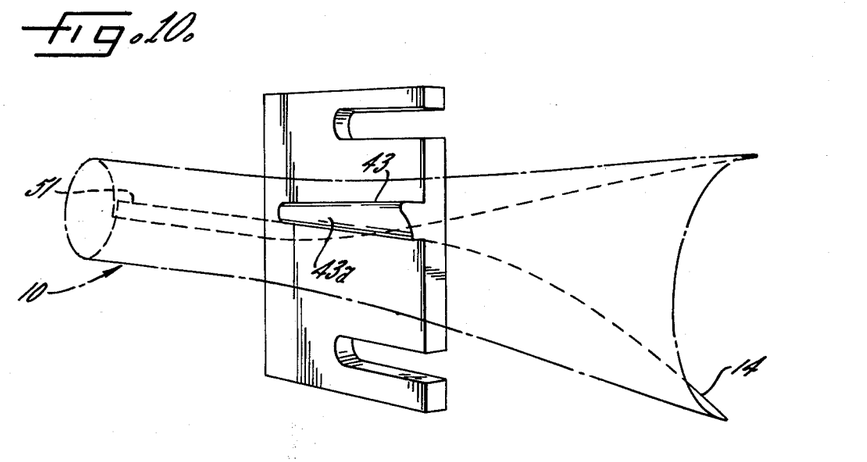
FIG. 10 is a perspective view of the tucking tool shown in FIGS. 8 and 9, with the metal strip acted upon by the tucking tool shown in phantom.

In keeping with the invention, the bores 41a and 42a of the die 41 and entry plate 42 are open along a substantial portion of one side thereof to permit entry of the dielectric material 16 into the extrusion nozzle 20 (see FIGS. 5 and 7). As clearly shown in FIGS. 4 and 7, the lateral extension of the nozzle 20 that forms the entrance 25 for the dielectric material 16 from the extruder head 17 extends through the side openings in the bores 41a and 42a. In the area occupied by this lateral extension of the nozzle 20, the edges of the strip 14 are still spaced apart so the nozzle does not interfere with the forming of the strip 14. The strip edges are brought closer and closer to each other as the strip 14 traverses the lateral nozzle extension, and the vertical dimension of the forward portion of the nozzle extension decreases in the direction of strip movement to conform with the narrowing space between the strip edges (FIGS. 5 and 7).

In order to overlap the edges of the strip 14 as they are brought together within the die 41, a small tucking tool 43 is mounted on the side of the die 41 with the working surface 43a of the tool 43 extending into the bore 41a through the side opening of the bore (FIGS. 5 and 7-10). As the edges of the strip approach each other during the rolling of the strip by the die 41, the curved surface 43a of the tool 43 engages the upper edge and forces it radially inwardly past the lower edge of the strip, thereby tucking the upper edge under the lower edge as the rolling of the strip 14 continues. The lower edge of the strip merely rides along the underside of the tool 43, remaining radially outwardly of the upper edge of the strip. Consequently, when the formation of the tube 13 is completed within the die 41, the strip edges overlap each other slightly with the upper edge lying under the lower edge (see FIGS. 8-10).

In accordance with one important aspect of the invention, the lapped edge portions of the rolled strip 14 are joined to each other before the dielectric material reaches its maximum radial thickness so that the outer conductor 13 is completed to enclose the inner member 11 and dielectric material 16 when the dielectric reaches its maximum radial thickness. Thus, in the illustrative embodiment the lapped edge portions of the strip 14 are ultrasonically welded at the exit end of the extrusion nozzle 20 with a portion of the outer surface of the nozzle forming an anvil 50 for the welding operation. A continuous welded seam 51 is formed between the lapped edges of the strip 14 as they pass between the anvil 50 and an ultrasonic welding tool in the form of a horizontal disc 52. To effect the ultrasonic weld, the disc 52 is oscillated in the direction of its axis at an extremely high frequency, typically on the order of 15,000 Hz. by a conventional ultrasonic transducer 54 connected to the disc by means of a coupler 53. In other words, the disc 52 is oscillated in a direction transverse to the direction of movement of the material being welded, i.e., the rolled strip 14. The disc 52 is resonant at the frequency of the transducer to provide amplification of the oscillatory movement at the periphery of the disc with respect to the driving point at the center, and the coupler 53 extends beyond the disc 52 where a force F is applied to the coupler at a one-quarter wave point (a true acoustical node) to increase the force of the disc 52 against the workpiece and to stabilize the entire welding head. To minimize friction between the strip 14 and the disc 52 in the direction in which the strip 14 is moving, the disc is rotated at a peripheral speed equal to the speed of advancement of the strip 14, thereby providing a zero velocity differential between the engaging surfaces of the strip 14 and the disc 52.

Ultrasonic welding discs and transducers of the type illustrated are commercially available, such as the Model GS-1500-AW-01 Frequency Converter and WS-1500-AW-01 Welding Head made and sold by Sonobond Corporation of Westchester, Pennsylvania. The term "ultrasonic" welding generally refers to welding effected by vibratory movement of a welding head or tool at a frequency above about 15,000 Hz. The use of ultrasonic welding in the present invention offers a number of advantages which contribute to more efficient and more versatile production of the desired product. For example, the ultrasonic welding equipment is relatively insensitive to minor variations in the line speed of the material being welded. Ultrasonic welding also permits relatively high production rates, and does not generate large amounts of heat to be controlled and dissipated.

The surface of the anvil 50 is relieved in a pattern that is oriented in the direction of movement of the strip 14, i.e., transverse to the oscillatory movement of the welding disc 52. This orientation of the anvil surface provides relatively high friction between the workpiece and the anvil in the transverse direction to prevent transverse slippage of the workpiece on the anvil, while minimizing friction in the machine direction to maintain smooth, uninterrupted movement of the strip 14 through the welding station. It has been found that this type of anvil permits the attainment of continuous weld seams which are highly uniform without any wrinkling or buckling of the metal strip 14.

Figures 11, 12:
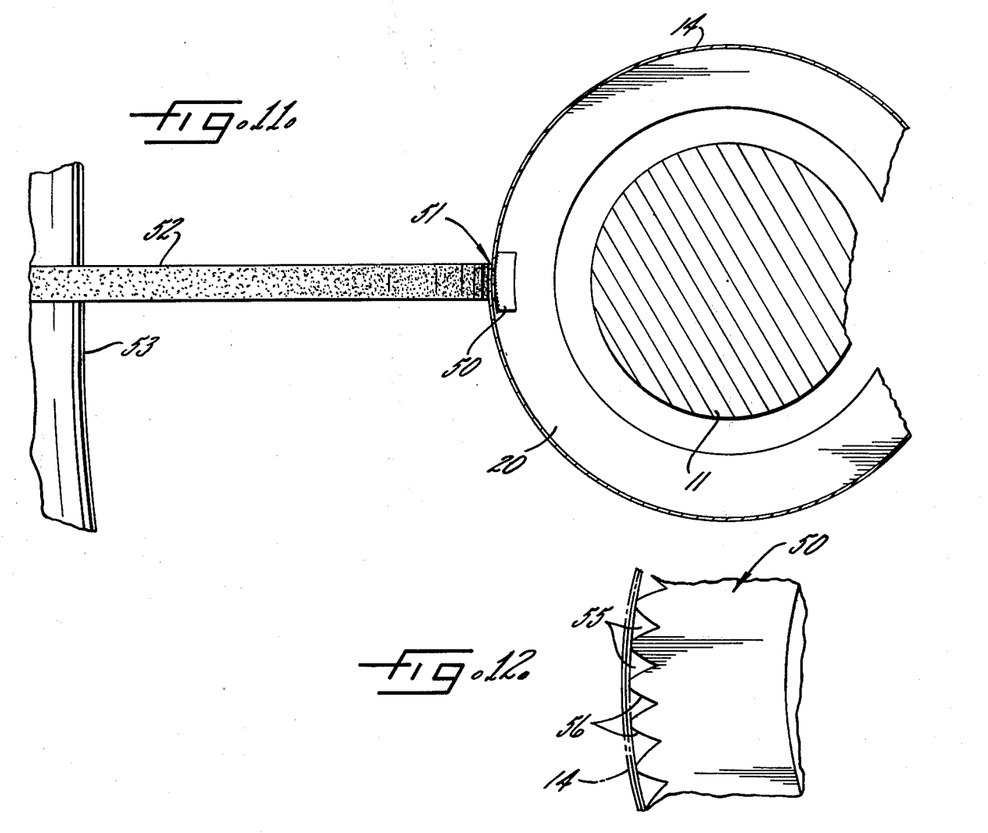
FIG. 11 is an enlarged view of the welding tools in the apparatus of FIGS. 1–7, with the material being welded shown in section.
FIG. 12 is a greatly enlarged fragmentary elevation of the surface of the welding anvil shown in FIG. 11.

The specific configuration of the anvil surface in the illustrative embodiment of the invention is most clearly shown in FIG. 12. It can be seen that the anvil surface comprises a series of grooves 55 which extend parallel to the direction of movement of the outer conductor. These grooves are preferably extremely narrow, e.g., about 0.005 inch. Grooves of this type can be formed in the anvil surface by electric discharge machining, making repeated passes over the anvil surface in the machine direction to form the desired grooves. The ridges 56 between adjacent grooves 55 are preferably truncated, as shown in FIG. 12, to form flat lands on the tops of the ridges. It has been found that these truncated ridges are preferred over sharp ridges to achieve the desired transverse friction without abrading the surface of the material being welded.

One of the significant advantages of the present invention is that it permits the outer conductor to be formed from thinner metal than has been possible with previous commercial processes. Because the outer conductor is completely formed and sealed before the dielectric reaches its maximum radial thickness, there is no need to oversize the outer conductor initially to provide an inner space to permit the welding of the outer conductor, nor is there any need to draw down the outer conductor to achieve the desired final dimensions and to bring the outer conductor close to the dielectric. With the present invention, the entire coaxial product is completely formed at the extrusion nozzle, and the only subsequent operations required are the corrugating of the outer conductor and encasing the product in a plastic sheath, if a corrugated and/or encased product is desired. The thinner starting material permitted by the present invention reduces the cost of the product and improves its uniformity, without degrading the performance of the product; coaxial cables of this type are generally used in transmitting high frequency signals which are conducted along the surfaces of the conductors due to the well known phenomenon of "skin effect". Furthermore, the thinner material used for the outer conductor is easier to weld by ultrasonic welding than by other welding techniques; contributes to the feasibility of the lap seam that is needed to form an ultrasonic weld in the most efficient manner; and generates less heat to be removed from the coaxial product so that the production line can be shorter and, therefore, less expensive.

This invention also enables a single extrusion nozzle to be used for multiple functions. In the illustrative system, for example, the nozzle 20 is not only used to extrude the dielectric 16 onto the inner conductor 11, but also serves as a forming tool for the outer conductor and as a mount for the welding anvil. Consequently, capital costs are reduced while providing efficient utilization of space and a short production line.

One possible modification of the illustrative arrangement is to provide a corrugating station adjacent the exit end of the extrusion nozzle 20 so that the outer conductor 13 is corrugated before the dielectric 16 has expanded to its maximum radial dimension. Thus, the dielectric expansion would continue after corrugation of the outer conductor so that the dielectric would penetrate all the way into the crests of the corrugated outer conductor, ensuring complete filling of the space between the two conductors with the expanded dielectric. This is especially desirable in products that are to be helically corrugated and that must be "gas-blocked", i.e., that prevent the flow of gas longitudinally therethrough, because the dielectric blocks the flow of gas longitudinally through the crests of the helical corrugations. Another possible improvement is to heat the outer conductor so that it becomes bonded to the dielectric while the dielectric is still expanding, so that the interior space directly adjacent the inner surface of the outer conductor is completely filled with the dielectric material. It should be particularly noted that these modifications and improvements are particularly applicable to the forming system provided by the present invention, and would not be possible with most prior art systems for forming similar products.

Still other possible modifications and improvements will be apparent from the foregoing detailed description of the invention. For example, while the invention has been described with specific reference to a foamable or expandable dielectric, it will be recognized that nonexpandable dielectrics may be employed through the use of tapered extrusion nozzles that increase the radial thickness of the dielectric downstream of the welding station. Also, the invention is applicable to the production of coaxial products other than cables for radio frequency transmission, such as cryogenic transfer lines or other types of conduits that require an intermediate layer of insulation, either electrical or thermal.

I claim:

1. A method of producing continuous lengths of coaxial products having concentric inner and outer members and an intermediate layer of insulating material between the inner and outer members, said method comprising the steps of
    a. continuously advancing a continuous length of said inner member,
    b. continuously forming a concentric layer of the insulating material on the outer surface of said inner member by passing said inner member through an extrusion nozzle while extruding said insulating material through said nozzle with the radial thickness of the insulating material increasing in the machine direction in a predetermined zone traversed by the advancing inner member,
    c. and continuously advancing a continuous flat metal strip alongside said inner member, rolling said strip around said extrusion nozzle to form said strip into an outer member surrounding said inner member, and joining the longitudinal edge portions of the formed strip while the strip is still around said extrusion nozzle and before the insulating material reaches its maximum radial thickness so that the outer member is completed to enclose the inner member and insulating material when the outer member is advanced beyond said extrusion nozzle and the insulating material reaches its maximum radial thickness.

2. A method of producing continuous lengths of coaxial cable as set forth in claim 1 wherein said inner member is a metallic conductor, said insulating material is a dielectric, and said outer member is a metallic conductor.

3. A method of producing continuous lengths of coaxial products as set forth in claim 1 wherein said layer of insulating material is formed on said inner member before said outer member completely surrounds the inner member, and said insulating material is passed between the longitudinal edges of said strip for application to said inner member.

4. A method of producing continuous lengths of coaxial products as set forth in claim 1 wherein the insulating material extruded through said nozzle is an expandable material so that the layer of insulating material formed on said inner member expands to increase its radial thickness upon exiting from said nozzle.

5. A method or producing continuous lengths of coaxial products as set forth in claim 1 wherein a passageway feeding said extrusion nozzle extends laterally away from said strip between the longitudinal edges thereof.

6. A method of producing continuous lengths of coaxial products as set forth in claim 1 wherein the longitudinal edge portions of said strip are joined by slightly overlapping said edge portions and then ultrasonically welding the overlapping portions to each other.

7. A method of producing continuous lengths of coaxial products as set forth in claim 6 wherein an anvil for supporting said overlapped edge portions of said strip during the ultrasonic welding thereof is located in the space between said insulating material and said outer member, and the ultrasonic welding energy is applied to the outermost surface of said overlapped edge portions.

8. A method of producing continuous lengths of coaxial products as set forth in claim 1 wherein the longitudinal edge portions of said strip are joined by slightly overlapping said edge portions and then ultrasonically welding the overlapping portions to each other, and supporting said overlapped edge portions during the ultrasonic welding thereof by means of an anvil mounted on the outer surface of said extrusion nozzle.

9. Apparatus for producing continuous lengths of coaxial products having concentric inner and outer members and an intermediate layer of insulating material between the inner and outer members, said apparatus comprising the combination of:
   a. means for continuously advancing a continuous length of said inner member.
   b. an extrusion nozzle adapted to pass said inner member therethrough for continuously extruding a concentric layer of insulating material onto the outer surface of said inner member,
   c. means for continuously advancing a continuous flat metal strip alongside said inner member,
   d. means for rolling said strip around said extrusion nozzle to form said strip into an outer member surrounding said inner member, and
   e. means for joining the longitudinal edge portions of the formed strip while the strip is still around said extrusion nozzle so that the outer member is completed to enclose the inner member and insulating material when the outer member is advanced beyond the extrusion nozzle.

10. Apparatus for producing continuous lengths of coaxial products as set forth in claim 9 wherein a passageway feeding said extrusion nozzle extends laterally away from said strip between the longitudinal edges thereof.

11. Apparatus for producing continuous lengths of coaxial products as set forth in claim 9 which includes means for overlapping the longitudinal edge portions of said strip and ultrasonic welding means for welding the overlapping portions of the strip edges to each other.

12. Apparatus for producing continuous lengths of coaxial products as set forth in claim 11 which includes an anvil for supporting said overlapped edge portions of said strip during the ultrasonic welding, said anvil being located in the space between said insulating material and said outer member, and said ultrasonic welding means applying the ultrasonic welding energy to the outermost surface of said overlapped edge portions.

13. Apparatus for producing continuous lengths of coaxial products as set forth in claim 9 which includes means for overlapping the longitudinal edge portions of said strip, ultrasonic welding means for welding the overlapping portions of the strip edges to each other, and an anvil mounted on the outer surface of said extrusion nozzle for supporting the overlapped edge portions of said strip during the ultrasonic welding thereof.

* * * * *